(12) United States Patent
Nakamura

(10) Patent No.: US 11,759,985 B2
(45) Date of Patent: Sep. 19, 2023

(54) INSERT-MOLDED ARTICLE AND METHOD FOR PRODUCING THE SAME

(71) Applicant: NAKANISHI METAL WORKS CO., LTD., Osaka (JP)

(72) Inventor: Masayoshi Nakamura, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 0 days.

(21) Appl. No.: 17/649,251

(22) Filed: Jan. 28, 2022

(65) Prior Publication Data

US 2022/0250294 A1 Aug. 11, 2022

(30) Foreign Application Priority Data

Feb. 8, 2021 (JP) .................. 2021-018158

(51) Int. Cl.
*G02F 1/025* (2006.01)
*B29C 45/14* (2006.01)
*B29C 45/27* (2006.01)
*B29K 705/00* (2006.01)

(52) U.S. Cl.
CPC .... *B29C 45/14008* (2013.01); *B29C 45/2708* (2013.01); *B29K 2705/00* (2013.01); *Y10T 428/1352* (2015.01)

(58) Field of Classification Search
None
See application file for complete search history.

(56) References Cited

FOREIGN PATENT DOCUMENTS

| EP | 3335853 A1 | 6/2018 |
| FR | 3096628 A1 | 12/2020 |
| JP | 2008130208 A | 6/2008 |
| JP | 2010025087 A | 2/2010 |
| JP | 2021045863 | * 3/2021 |

* cited by examiner

*Primary Examiner* — Ellen S Hock
(74) *Attorney, Agent, or Firm* — INNOVATION CAPITAL LAW GROUP, LLP; Vic Lin

(57) ABSTRACT

A metal component has a shape including a flat plate-shaped part, and the flat plate-shaped part has a through-hole formed therein. A resin component has a shape including a covering part that covers a surface of the flat plate-shaped part, and the covering part has a surface in which a gate mark is present. The through-hole formed in the flat plate-shaped part of the metal component is located opposite to the gate mark. The resin component has a filler part with which the through-hole is filled.

3 Claims, 17 Drawing Sheets

INSERT-MOLDED ARTICLE AND METHOD FOR PRODUCING THE SAME

BACKGROUND OF THE INVENTION

Field of the Invention

The present invention relates to an insert-molded article including a metal component and a resin component.

Description of the Background Art

In various industrial fields, insert-molded articles including metal components and resin components have been widely used for the purpose of weight reduction or the like (refer to Patent Literatures 1 and 2, for example).

Patent Literature 1 discloses a disc hub used in a hydrodynamic bearing device. The disc hub 10 includes a core metal 13 as a metal component, and a resin molded part 14 as a resin component.

Patent Literature 2 discloses a rotor unit for an axial fan. The rotor unit includes a rotor holder 25 and a rotation shaft 21 as metal components, and an impeller 4 as a resin component.

CITATION LIST

Patent Literature

[PTL 1] Japanese Unexamined Patent Application Publication No. 2008-130208
[PTL 2] Japanese Unexamined Patent Application Publication No. 2010-025087

SUMMARY OF THE INVENTION

In the insert-molded article including the metal component and the resin component as described in Patent Literatures 1 and 2, the metal component has a flat plate-shaped part (refer to, for example, the substantially disk-shaped core metal 13 of Patent Literature 1, or an annular upper face 252 of the rotor holder 25 of Patent Literature 2), and the resin component has a covering part (refer to, for example, a disk part 10a of Patent Literature 1, or a substantially disk-shaped part of an impeller cup 41 of Patent Literature 2) that covers the surface of the flat plate-shaped part.

In an injection mold (refer to FIG. 6 of Patent Literature 1, for example) for producing the insert-molded article, a pin gate is adopted as a gate, and the gate is arranged so as to oppose the surface of the flat plate-shaped part of the metal component (refer to a gate 24 in FIG. 6(a) of Patent Literature 1, or a gate mark 443 in FIG. 5 of Patent Literature 2, for example).

In the insert-molded article, if the thickness of the covering part, of the resin component, which covers the surface of the flat plate-shaped part of the metal component is reduced in order to meet a demand for further weight reduction or space saving, the following drawbacks may occur. That is, for example, if the thickness of the resin immediately below the gate is smaller than the diameter of the gate, the thin resin immediately below the gate is solidified before the gate is solidified, and sufficient holding pressure cannot be applied. In this case, molding defects such as sink marks and voids are likely to occur, which may cause unstable dimensional accuracy and unstable strength. Moreover, a cold slug formed in the last shot may enter a cavity of the injection mold, which may deteriorate the appearance and strength of the molded article.

An object of the present invention is to inhibit occurrence of molding defects even when the thickness of a covering part, of a resin component, which covers the surface of a flat plate-shaped part of a metal component is reduced, thereby stabilizing dimensional accuracy and strength of an insert-molded article. Moreover, another object of the present invention is to inhibit a cold slug formed in the last shot from entering a cavity of an injection mold, thereby preventing the appearance and strength of the insert-molded article from being deteriorated.

The summary of the present invention is as follows.

(1) An insert-molded article including a metal component and a resin component, the metal component having a shape including a flat plate-shaped part, the flat plate-shaped part having a through-hole or a blind hole formed therein, the resin component having a shape including a covering part that covers a surface of the flat plate-shaped part, the covering part having a surface in which a gate mark is present, in which the through-hole or the blind hole formed in the flat plate-shaped part of the metal component is located opposite to the gate mark, and the resin component has a filler part with which the through-hole or the blind hole is filled.

(2) The insert-molded article according to the above (1), in which a distance from the gate mark to a surface of the flat plate-shaped part of the metal component is smaller than a diameter of the gate mark of the resin component.

(3) The insert-molded article according to the above (2), in which a distance from the gate mark to a rear surface of the flat plate-shaped part of the metal component or a distance from the gate mark to a bottom of the blind hole is larger than the diameter of the gate mark of the resin component.

(4) A method for producing an insert-molded article including a metal component and a resin component, the metal component having a shape including a flat plate-shaped part, the flat plate-shaped part having a through-hole or a blind hole formed therein, the resin component having a shape including a covering part that covers a surface of the flat plate-shaped part, the method using an injection mold having a pin gate as a gate, the method including: opening the mold, and setting the metal component as an insert article on the mold such that the through-hole or the blind hole is opposed to the pin gate; and closing the mold, and injecting a molten molding resin material from the pin gate to form the resin component through injection molding.

(5) The method for producing an insert-molded article according to the above (4), in which a distance from the pin gate to the surface of the flat plate-shaped part of the metal component is smaller than a diameter of the pin gate.

(6) The method for producing an insert-molded article according to the above (5), in which a distance from the pin gate to a rear surface of the flat plate-shaped part of the metal component or a distance from the pin gate to a bottom of the blind hole is larger than the diameter of the pin gate.

The "insert-molded article" of the present invention is a molded article that is produced through insert molding in which a metal component and a resin component are integrated with each other by injecting a resin around the metal component that is inserted in the injection mold.

The "gate mark" of the present invention is a trace, in the insert-molded article, of the gate of the injection mold, or a portion, of the insert-molded article, in which the trace of the gate is cut off through machining or the like.

According to the insert-molded article and the method for producing the insert-molded article of the present invention, the through-hole or the blind hole of the metal component is opposed to the pin gate, when the insert-molded article is produced by injection-molding the resin component with the molten resin material injected through the pin gate opposing the surface of the flat plate-shaped part of the metal component. Therefore, even when the thickness of the covering part, of the resin component, which covers the surface of the flat plate-shaped part of the metal component is reduced, the resin immediately below the gate is thick. Therefore, the resin immediately below the gate is prevented from being solidified before the gate is solidified, whereby sufficient holding pressure can be applied.

Consequently, molding defects such as sink marks and voids hardly occur, whereby the dimensional accuracy and strength of the insert-molded article are stabilized. Moreover, a cold slug formed in the last shot is inhibited from entering the cavity of the injection mold, whereby the appearance and strength of the insert-molded article are prevented from being deteriorated.

DESCRIPTION OF THE PREFERRED EMBODIMENTS

Hereinafter, embodiments according to the present invention will be described with reference to the drawings.

Herein, a view as seen toward the surface of a flat plate-shaped part of a metal component (e.g., FIG. 2A, FIG. 8A, FIG. 14A, FIG. 16A, FIG. 20A) is defined as a front view.

<Insert-Molded Article>

Figure 1:
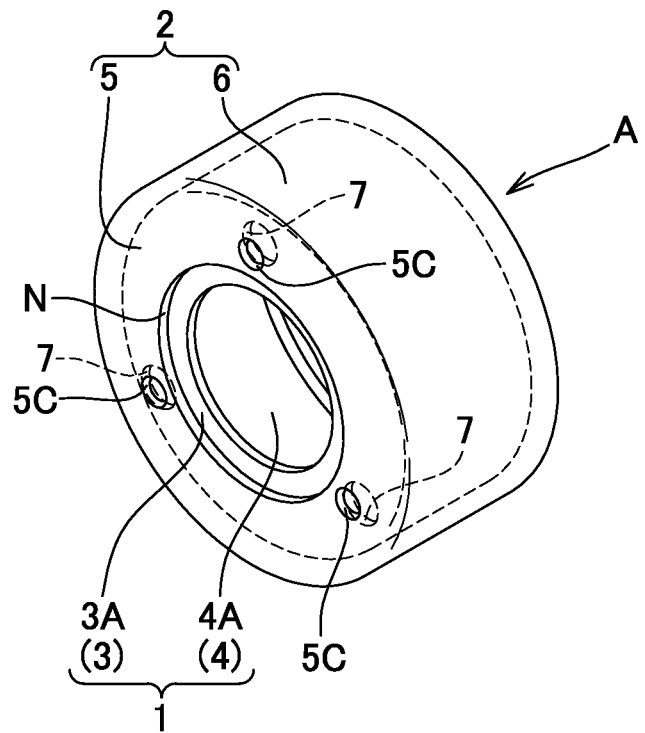
FIG. 1 is a perspective view of an insert-molded article according to an embodiment of the present invention.
Figure 2A:
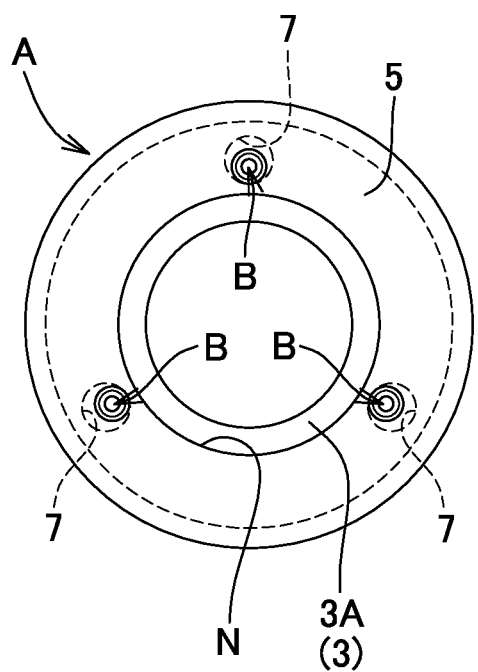
FIG. 2A is a front view of the insert-molded article shown in FIG. 1.
Figure 2B:
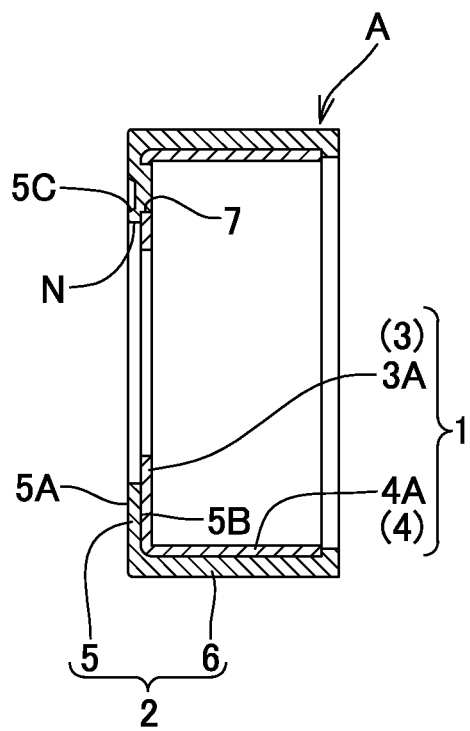
FIG. 2B is a vertical cross-sectional right side view of the insert-molded article shown in FIG. 1.
Figure 3A:
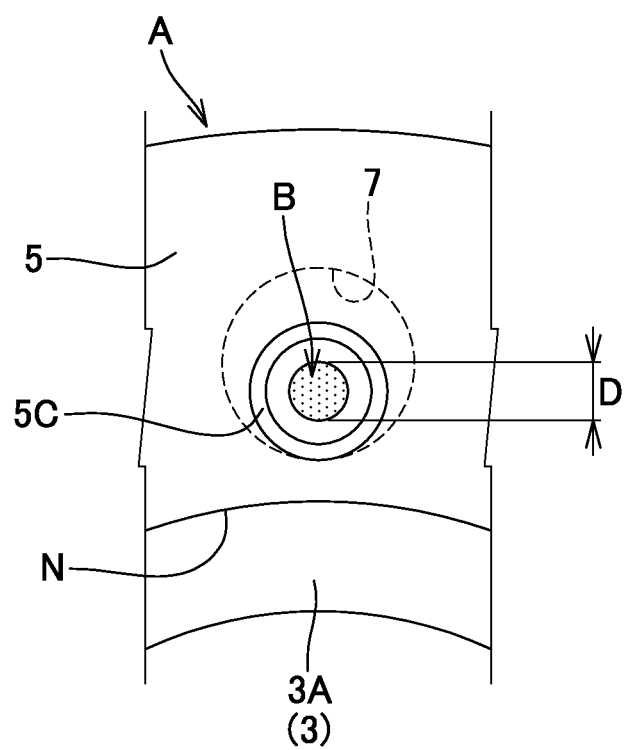
FIG. 3A is an enlarged front view of a main part of the insert-molded article shown in FIG. 1.
Figure 3B:
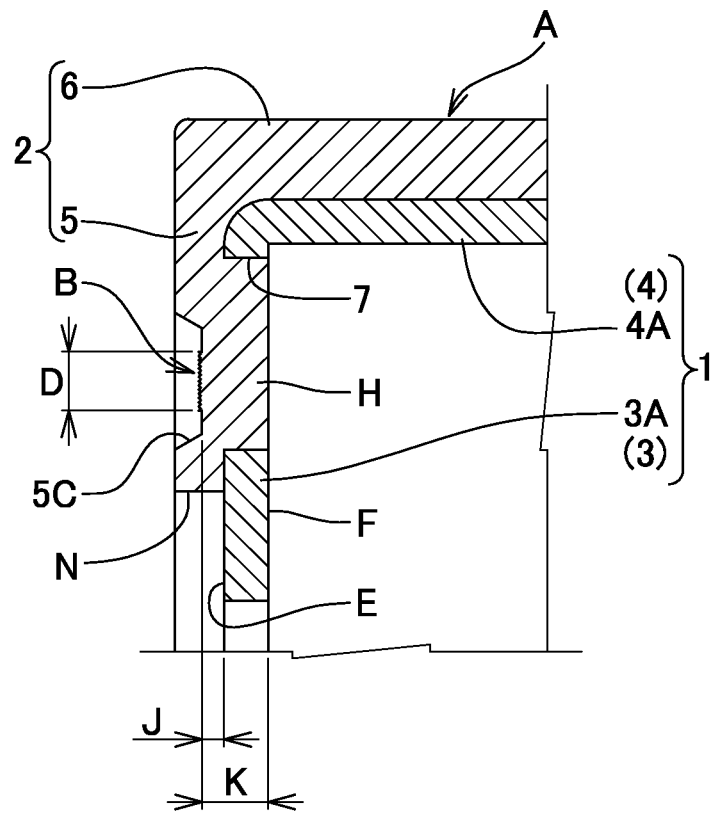
FIG. 3B is an enlarged vertical cross-sectional right side view of the main part of the insert-molded article shown in FIG. 1.
Figure 4:
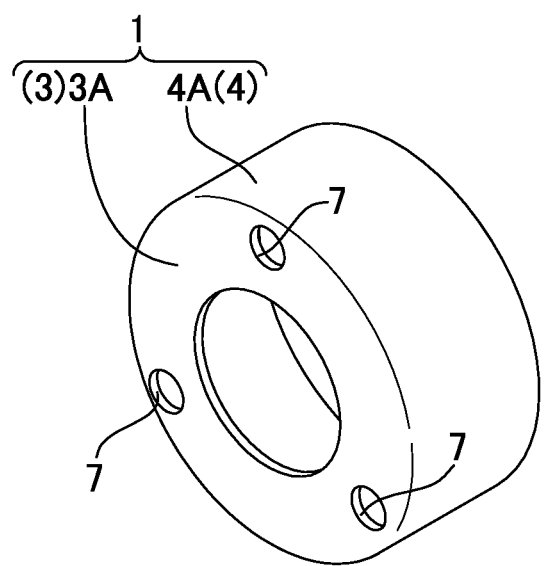
FIG. 4 is a perspective view of a metal component of the insert-molded article shown in FIG. 1.

An insert-molded article A according to an embodiment of the present invention includes a metal component 1 and a resin component 2 as shown in a perspective view of FIG. 1, a front view of FIG. 2A, a vertical cross-sectional right side view of FIG. 2B, a main-part-enlarged front view of FIG. 3A, a main-part-enlarged vertical cross-sectional right side view of FIG. 3B, and a perspective view of FIG. 4. The resin component 2 is obtained by, for example, molding a thermoplastic resin that is excellent in productivity.

The metal component 1 includes a hollow disk 3A as a flat plate-shaped part 3, and a cylinder 4A as a tubular part 4. The hollow disk 3A has, for example, three through-holes 7 formed at equal intervals in a circumferential direction thereof.

The resin component 2 includes a covering part 5 which covers a surface E of the hollow disk 3A, and a covering part 6 which covers an outer peripheral surface of the cylinder 4A. At a surface 5A of the covering part 5, gate marks B are present in recesses 5C serving as gate clearances.

The through-holes 7 formed in the hollow disk 3A of the metal component 1 are located opposite to the gate marks B at a rear surface 5B of the covering part 5 of the resin component 2. The resin component 2 has a filler part H (see FIG. 3B) with which each through-hole 7 is filled. The filler part H also functions as a rotation stopper for the metal component 1 and the resin component 2.

As shown in FIG. 2B, in the insert-molded article A, the rear surface of the hollow disk 3A and the inner peripheral surface of the cylinder 4A are exposed. Therefore, in an insert article setting process of an insert-molded article production method described later, when the metal component 1 is set on a movable mold 10 (FIG. 5) of an injection mold I, the rear surface of the hollow disk 3A and the inner peripheral surface of the cylinder 4A come into contact with the movable mold 10, whereby the metal component 1 as an insert article can be positioned in the axial direction and the radial direction with respect to the movable mold 10.

As shown in FIGS. 2A and 2B, the inner diameter of the covering part 5 which covers the surface of the hollow disk 3A is larger than the inner diameter of the hollow disk 3A, and an inner peripheral portion of the surface of the hollow disk 3A is exposed. Therefore, when the injection mold I is clamped in an injection molding process of the insert-molded article production method described later, the inner peripheral portion of the surface of the hollow disk 3A comes into contact with a fixed mold 9 (FIG. 5) and is stabilized.

A distance J from the gate mark B shown in FIGS. 3A and 3B to a surface E of the hollow disk 3A as the flat plate-shaped part 3 of the metal component 1 is smaller than a diameter D of the gate mark B of the resin component 2 (J<D). A distance K from the gate mark B to a rear surface F of the hollow disk 3A as the flat plate-shaped part 3 of the metal component 1 is larger than the diameter D of the gate mark B of the resin component 2 (K>D). The relationship of K>D prevents the resin immediately below the gate from being solidified before the gate is solidified, whereby sufficient holding pressure can be applied.

<Method for Producing Insert-Molded Article>

Figure 5:
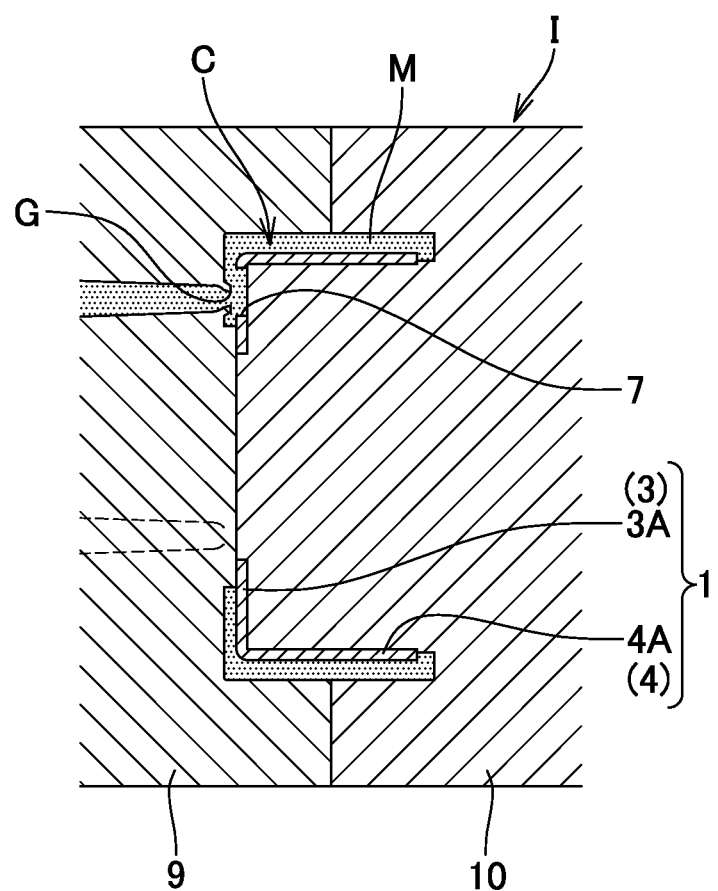
FIG. 5 is a vertical cross-sectional view schematically showing an injection mold for producing the insert-molded article shown in FIG. 1.

With reference to an injection mold I schematically shown in a vertical cross-sectional view of FIG. 5 and a main-part-enlarged vertical cross-sectional view of FIG. 6, a method for producing the insert-molded article A will be described. Gates of the injection mold I are pin gates G.

(Insert Article Setting Process)

The movable mold 10 of the injection mold I is opened, and the metal component 1 as an insert article is set on the movable mold 10 so that the through-holes 7 of the hollow disk 3A are opposed to the pin gates G of the fixed mold 9.

(Injection Molding Process)

The movable mold 10 of the injection mold I is closed and clamped, and a molten molding resin material M of the resin component 2 is injected into a cavity C through the pin gates G of the fixed mold 9, thereby injection-molding the resin component 2.

Figure 6:
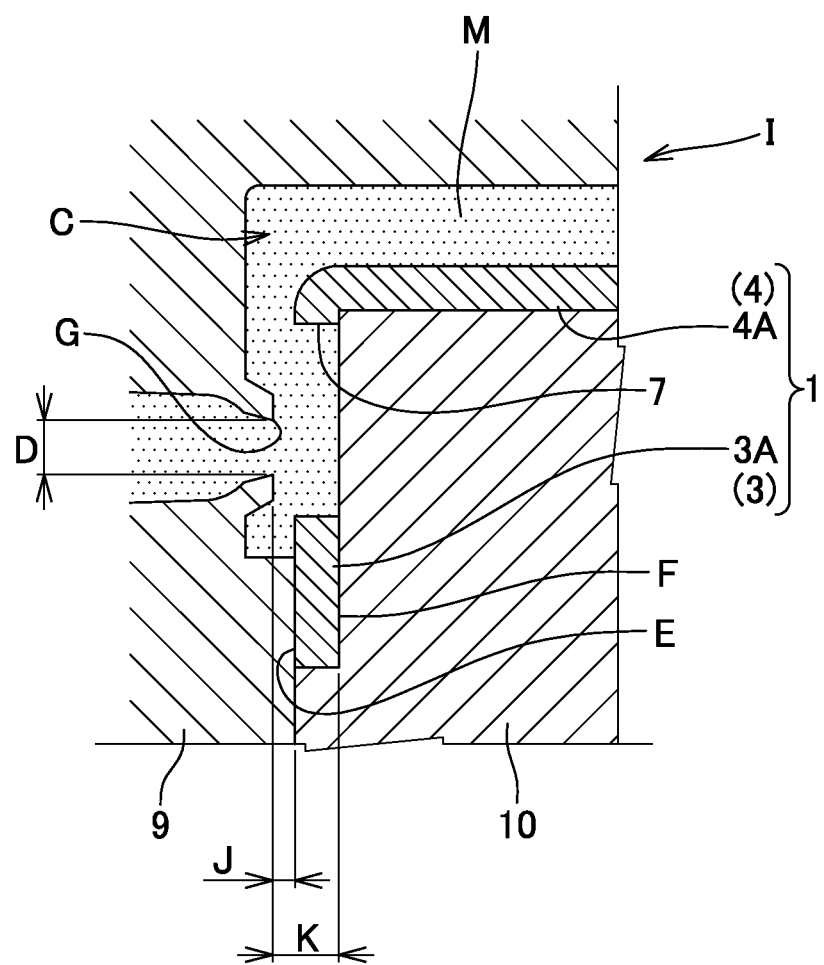
FIG. 6 is an enlarged vertical cross-sectional view of a main part of the injection mold shown in FIG. 5.

A distance J from the pin gate G shown in FIG. 6 to the surface E of the hollow disk 3A of the metal component 1 is smaller than a diameter D of the pin gate G (J<D). A distance K from the pin gate G to the rear surface F of the hollow disk 3A of the metal component 1 is larger than the diameter D of the pin gate G (K>D).

(Molded Article Taking-Out Process)

After the resin is solidified by cooling the injection mold I, the movable mold 10 is opened. Then, the insert-molded article A is automatically separated from the pin gates G, and the gate marks B (see FIG. 2A and FIGS. 3A and 3B) are left in the insert-molded article A. Next, the insert-molded article A is pushed with ejector pins (not shown) provided in the movable mold 10, so as to be taken out.

<Insert-Molded Article of First Modification>

Figure 7:
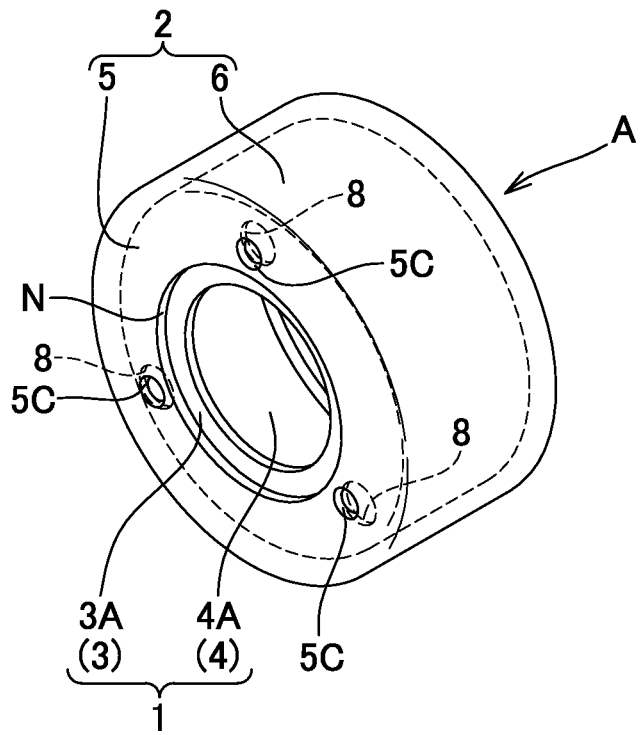
FIG. 7 is a perspective view of an insert-molded article according to a first modification.
Figure 8A:
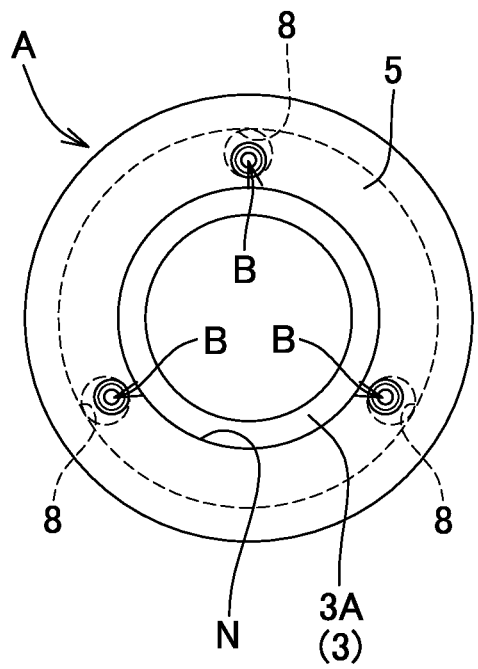
FIG. 8A is a front view of the insert-molded article shown in FIG. 7.
Figure 8B:
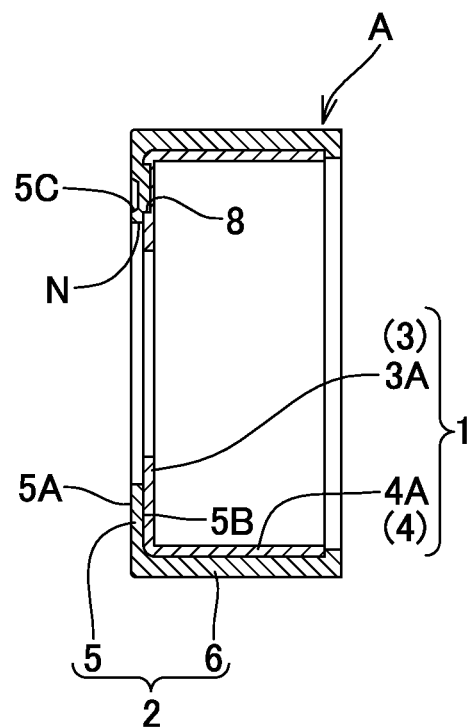
FIG. 8B is a vertical cross-sectional right side view of the insert-molded article shown in FIG. 7.
Figure 9A:
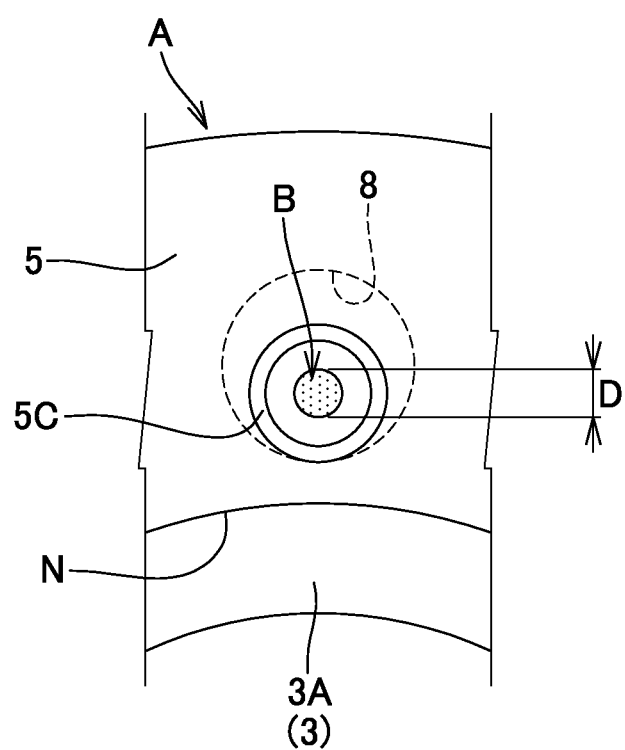
FIG. 9A is an enlarged front view of a main part of the insert-molded article shown in FIG. 7.
Figure 9B:
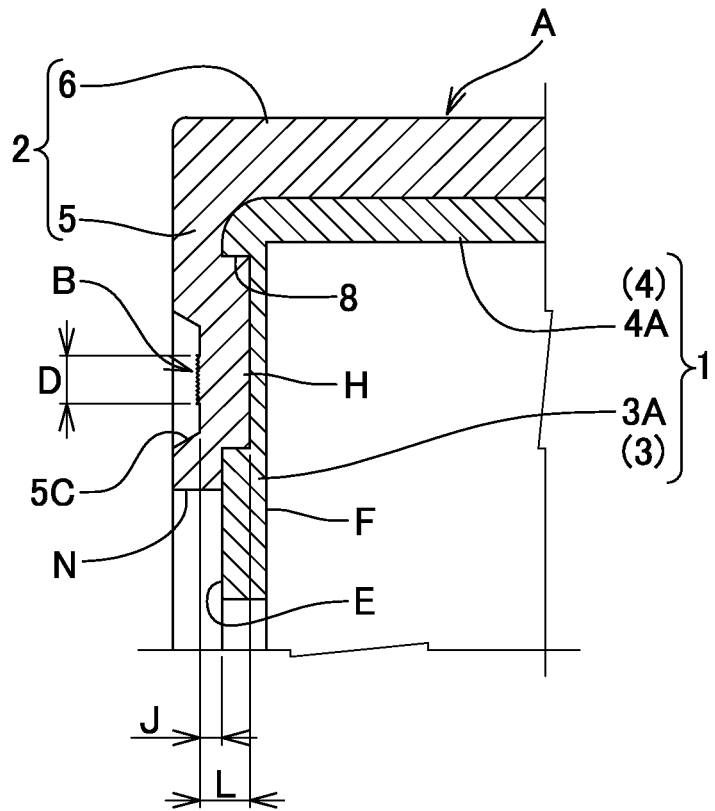
FIG. 9B is an enlarged vertical cross-sectional right side view of the main part of the insert-molded article.
Figure 10:
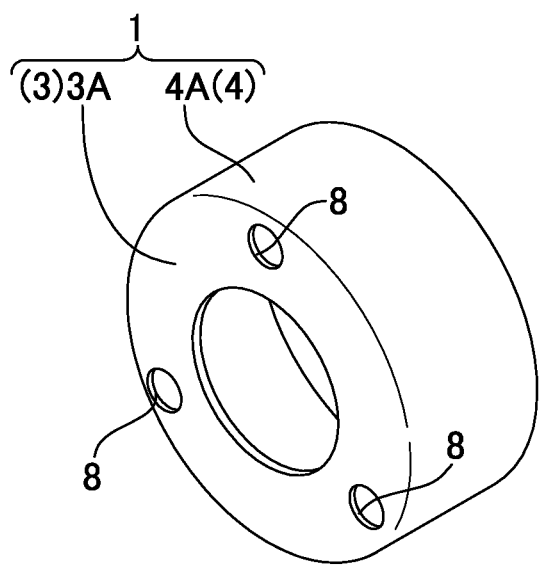
FIG. 10 is a perspective view of a metal component of the insert-molded article shown in FIG. 7.

In an insert-molded article A according to a first modification shown in a perspective view of FIG. 7, a front view of FIG. 8A, a vertical cross-sectional right side view of FIG. 8B, a main-part-enlarged front view of FIG. 9A, and a main-part-enlarged vertical cross-sectional right side view of FIG. 9B, the same reference characters as in FIG. 1, FIGS. 2A and 2B, and FIGS. 3A and 3B indicate the same or corresponding components or parts. Moreover, in a metal component 1 shown in a perspective view of FIG. 10, the same reference characters as in FIG. 4 indicate the same or corresponding parts.

In the insert-molded article A of the first modification, the hollow disk 3A as the flat plate-shaped part 3 of the metal component 1 has blind holes 8 instead of the through-holes 7.

A distance J from a gate mark B shown in FIGS. 9A and 9B to the surface E of the hollow disk 3A as the flat plate-shaped part 3 of the metal component 1 is smaller than the diameter D of the gate mark B of the resin component 2 (J<D). Meanwhile, a distance L from the gate mark B to the bottom of the blind hole 8 of the hollow disk 3A as the flat plate-shaped part 3 of the metal component 1 is larger than the diameter D of the gate mark B of the resin component 2 (L>D). The relationship of L>D prevents the resin immediately below the gate from being solidified before the gate is solidified, whereby sufficient holding pressure can be applied.

<Method for Producing Insert-Molded Article of First Modification>

Figure 11:
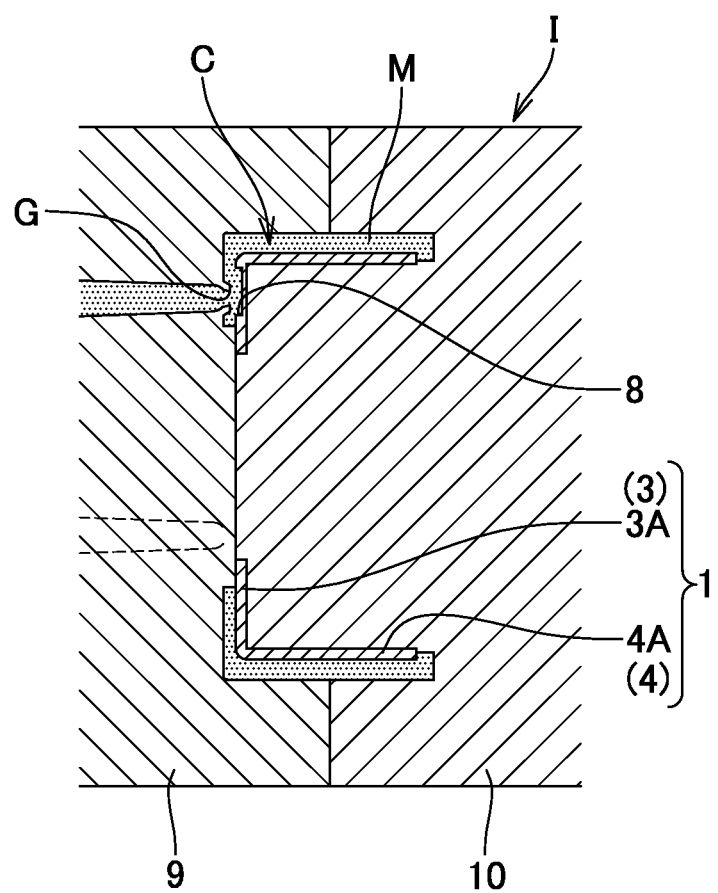
FIG. 11 is a vertical cross-sectional view schematically showing an injection mold for producing the insert-molded article shown in FIG. 7.

With reference to an injection mold I schematically shown in a vertical cross-sectional view of FIG. 11 and a main-part-enlarged vertical cross-sectional view of FIG. 12, a method for producing the insert-molded article A of the first modification will be described. Gates of the injection mold I are pin gates G.

(Insert Article Setting Process)

The movable mold 10 of the injection mold I is opened, and the metal component 1 as an insert article is set on the movable mold 10 so that the blind holes 8 of the hollow disk 3A are opposed to the pin gates G of the fixed mold 9.

(Injection Molding Process)

The movable mold 10 of the injection mold I is closed and clamped, and a molten molding resin material M of the resin component 2 is injected into the cavity C through the pin gates G of the fixed mold 9, thereby injection-molding the resin component 2.

Figure 12:
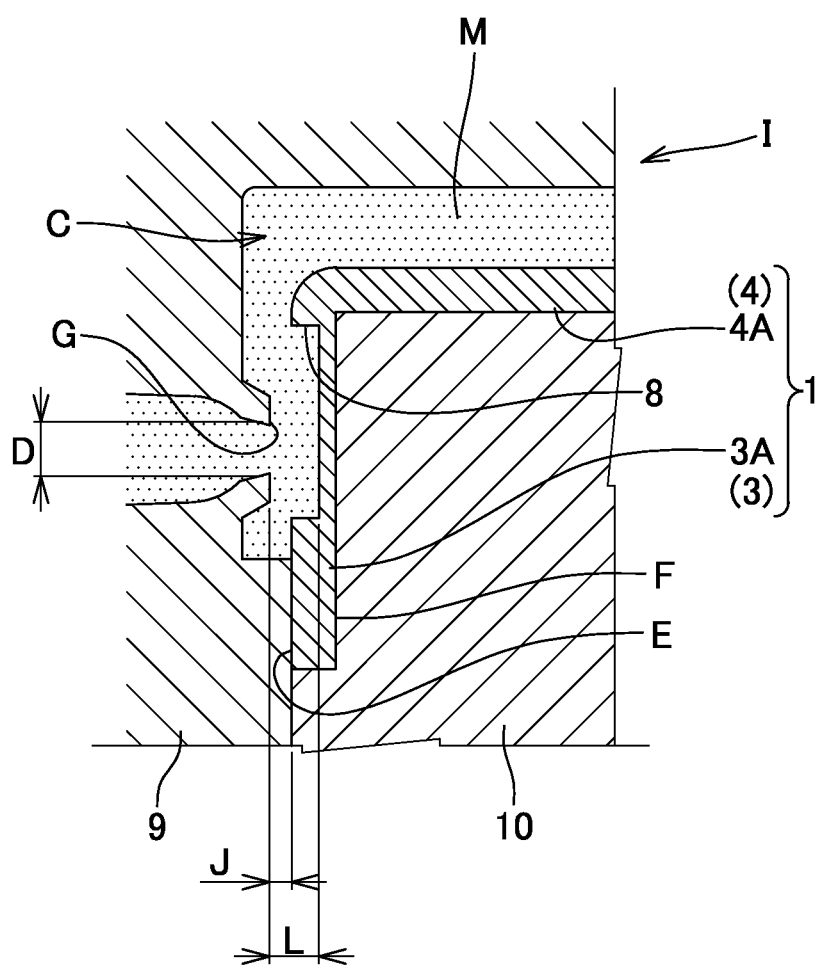
FIG. 12 is an enlarged vertical cross-sectional view of a main part of the injection mold shown in FIG. 11.

A distance J from the pin gate G shown in FIG. 12 to the surface E of the hollow disk 3A of the metal component 1 is smaller than the diameter D of the pin gate G (J<D). A distance L from the pin gate G to the bottom of the blind hole 8 of the hollow disk 3A of the metal component 1 is larger than the diameter D of the pin gate G (L>D).

(Molded Article Taking-Out Process)

After the resin is solidified by cooling the injection mold I, the movable mold 10 is opened. Then, the insert-molded article A is automatically separated from the pin gates G, and the gate marks B (see FIG. 8A and FIGS. 9A and 9B) are left in the insert-molded article A. Next, the insert-molded article A is pushed with ejector pins (not shown) provided in the movable mold 10, so as to be taken out.

<Insert-Molded Article of Second Modification>

Figure 13:
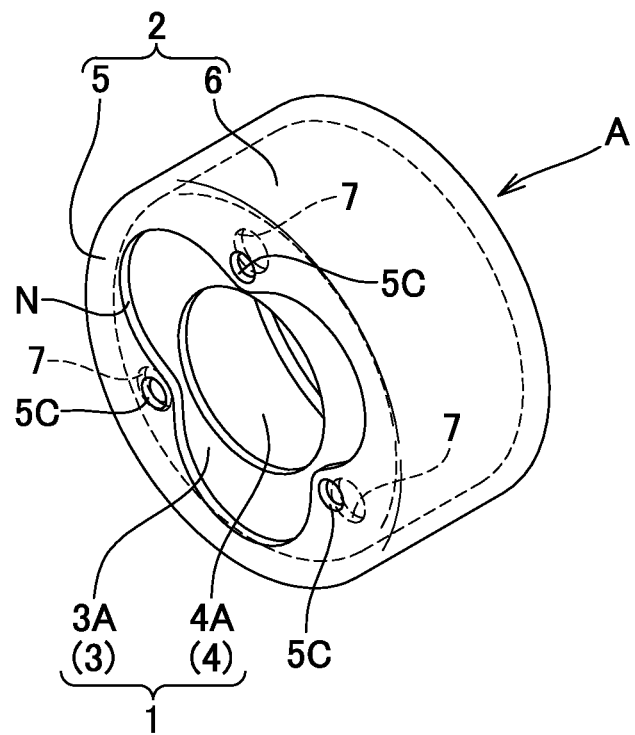
FIG. 13 is a perspective view of an insert-molded article according to a second modification.
Figure 14A:
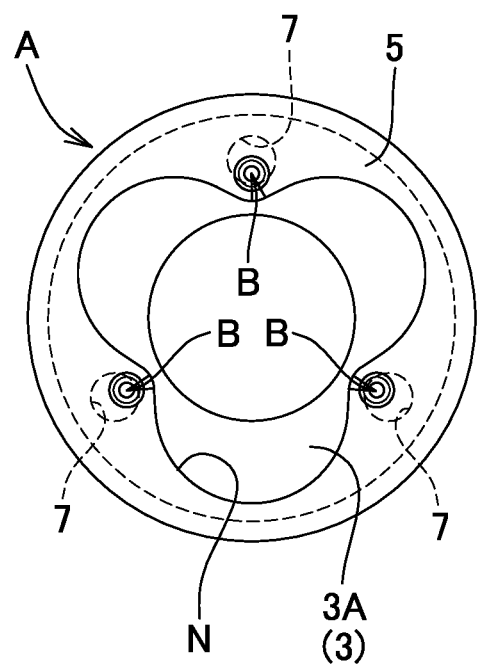
FIG. 14A is a front view of the insert-molded article shown in FIG. 13.
Figure 14B:
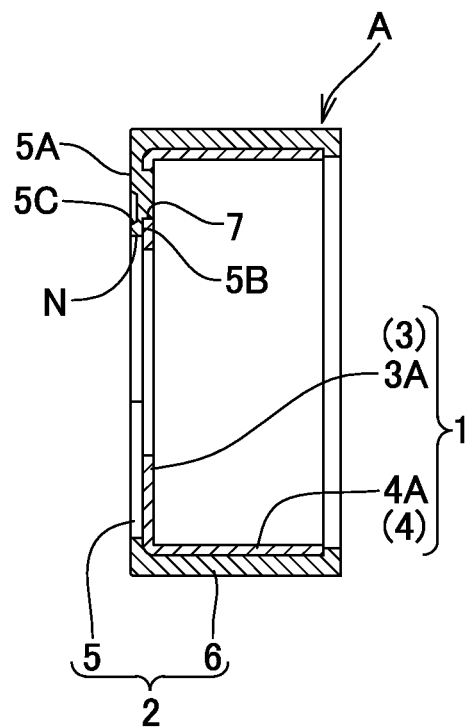
FIG. 14B is a vertical cross-sectional right side view of the insert-molded article shown in FIG. 13.

In an insert-molded article A according to a second modification shown in a perspective view of FIG. 13, a front view of FIG. 14A, and a vertical cross-sectional right side view of FIG. 14B, the same reference characters as in FIG. 1 and FIGS. 2A and 2B indicate the same or corresponding components or parts.

In the insert-molded article A of the second modification, the shape of an inner peripheral surface N of the covering part 5 is not a circle as shown in FIG. 1 and FIGS. 2A and 2B. The inner peripheral surface N retracts radially outward except for portions near the gate marks B and the recesses 5C as gate clearances, thereby reducing the weight of the covering part 5.

<Insert-Molded Article of Third Modification>

Figure 15:
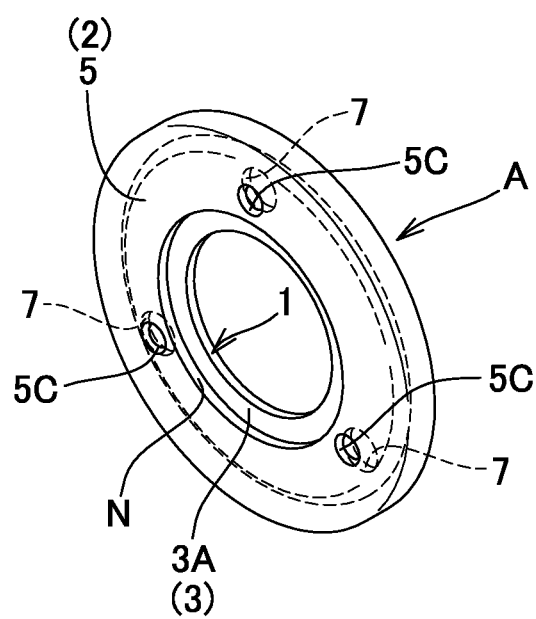
FIG. 15 is a perspective view of an insert-molded article according to a third modification.
Figure 16A:
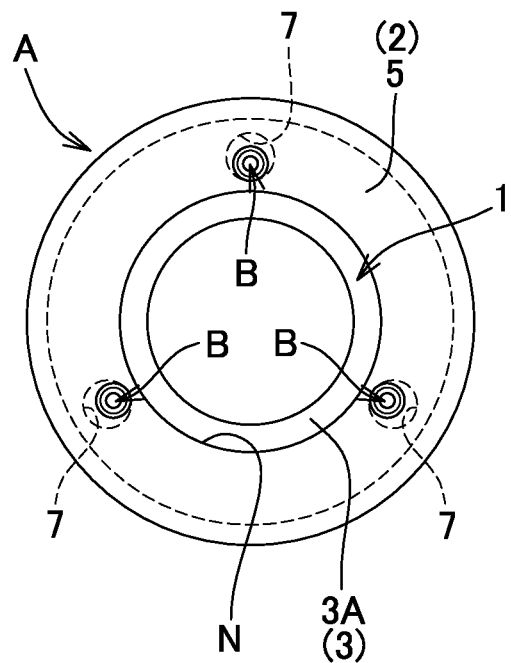
FIG. 16A is a front view of the insert-molded article shown in FIG. 15.
Figure 16B:
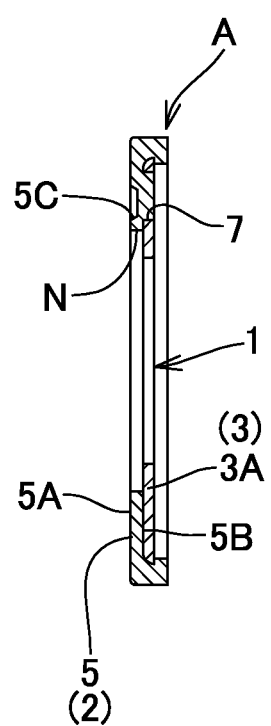
FIG. 16B is a vertical cross-sectional right side view of the insert-molded article shown in FIG. 15.
Figure 17:
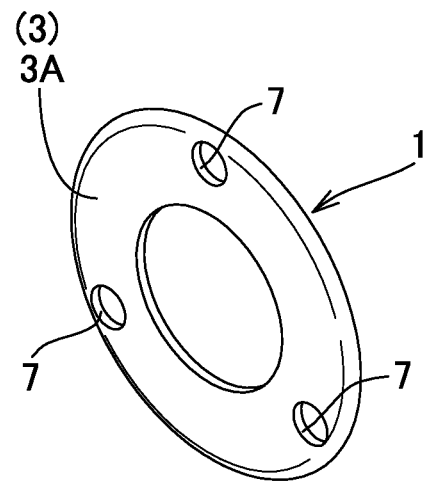
FIG. 17 is a perspective view of a metal component of the insert-molded article shown in FIG. 15.

In an insert-molded article A according to a third modification shown in a perspective view of FIG. 15, a front view of FIG. 16A, and a vertical cross-sectional right side view of FIG. 16B, the same reference characters as in FIG. 1 and FIGS. 2A and 2B indicate the same or corresponding components or parts. Moreover, in a metal component 1 shown in a perspective view of FIG. 17, the same reference characters as in FIG. 4 indicate the same or corresponding parts.

The insert-molded article A of the third modification has a hollow disk shape. Therefore, the metal component 1 shown in the perspective view of FIG. 17 does not have a cylinder 4A (cylinder part 4) shown in FIG. 4, and a resin component 2 shown in the perspective view of FIG. 15 does not have a covering part 6 which covers the outer peripheral surface of a cylinder 4A as shown in FIG. 1.

As shown in FIG. 16B, in the insert-molded article A, a rear surface of a hollow disk 3A is exposed. Therefore, in an insert article setting process of an insert-molded article producing method described later, when the metal component 1 is set on the movable mold 10 (FIG. 18) of the injection mold I, the rear surface of the hollow disk 3A comes into contact with the movable mold 10, whereby the metal component 1 as an insert article can be positioned in the axial direction with respect to the movable mold 10.

As shown in FIG. 16A and FIG. 16B, the inner diameter of the covering part 5 which covers the surface of the hollow disk 3A is larger than the inner diameter of the hollow disk 3A, so that an inner peripheral portion of the surface of the hollow disk 3A is exposed. Therefore, when the injection mold I is clamped in the injection molding process of the insert-molded article production method described later, the inner peripheral portion of the surface of the hollow disk 3A comes into contact with the fixed mold 9 (FIG. 18) and is stabilized.

<Method for Producing Insert-Molded Article of Third Modification>

Figure 18:
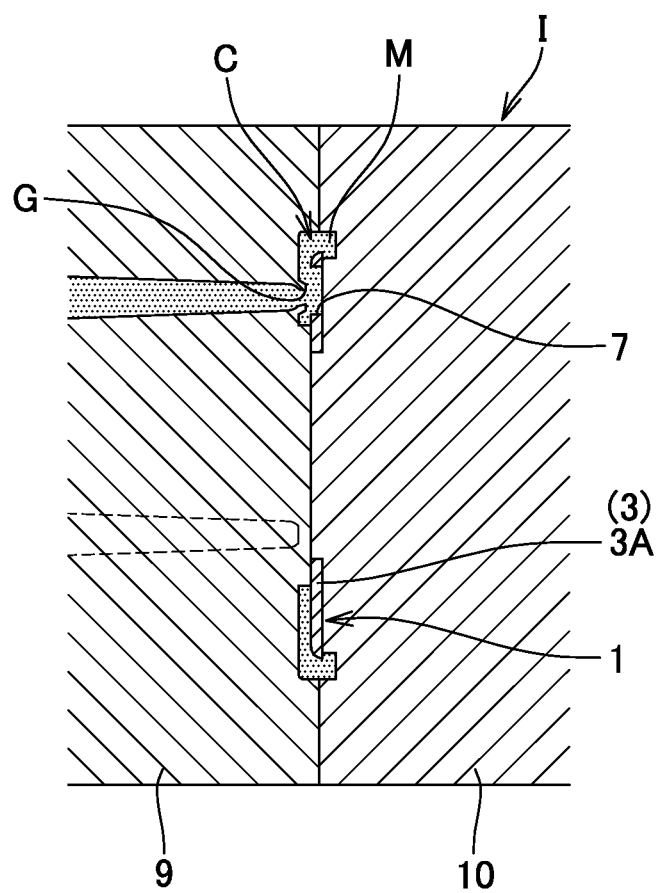
FIG. 18 is a vertical cross-sectional view schematically showing an injection mold for producing the insert-molded article shown in FIG. 15.

With reference to an injection mold I schematically shown in a vertical cross-sectional view of FIG. 18, a method for producing the insert-molded article A of the third modification will be described. Gates of the injection mold I are pin gates G.

(Insert Article Setting Process)

The movable mold 10 of the injection mold I is opened, and the metal component 1 as an insert article is set on the movable mold 10 so that the through-holes 7 of the hollow disk 3A are opposed to the pin gates G of the fixed mold 9.

(Injection Molding Process)

The movable mold 10 of the injection mold I is closed and clamped, and a molten molding resin material M of the resin component 2 is injected into the cavity C through the pin gates G of the fixed mold 9, thereby injection-molding the resin component 2.

(Molded Article Taking-Out Process)

After the resin is solidified by cooling the injection mold I, the movable mold 10 is opened. Then, the insert-molded article A is automatically separated from the pin gates G, and the gate marks B (see FIG. 16A) are left in the insert-molded article A. Next, the insert-molded article A is pushed with ejector pins (not shown) provided in the movable mold 10, so as to be taken out.

<Insert-Molded Article of Fourth Modification>

Figure 19:
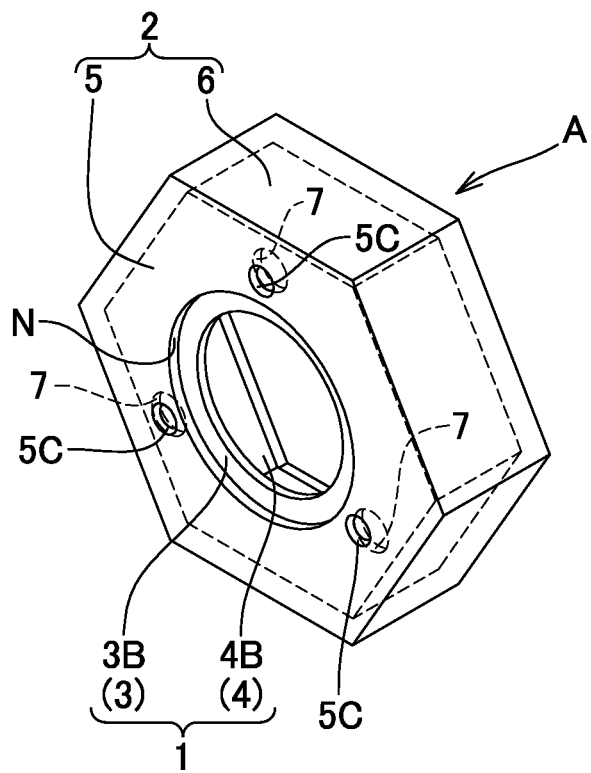
FIG. 19 is a perspective view of an insert-molded article according to a fourth modification.
Figure 20A:
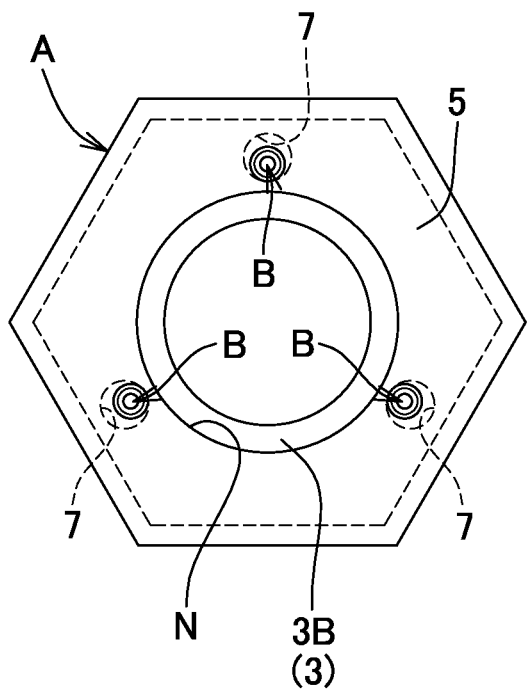
FIG. 20A is a front view of the insert-molded article shown in FIG. 19.
Figure 20B:
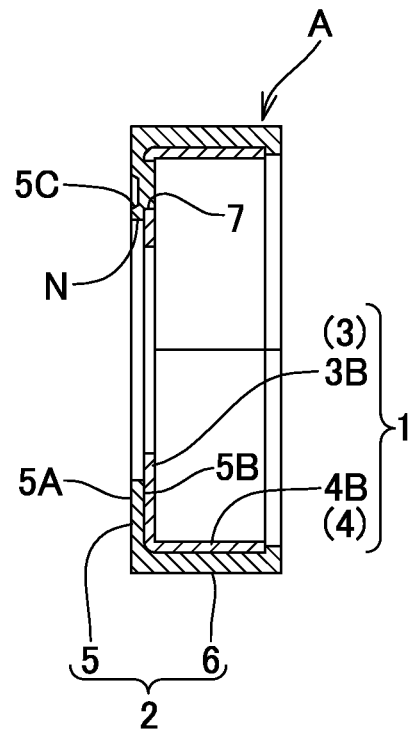
FIG. 20B is a vertical cross-sectional right side view of the insert-molded article shown in FIG. 19.
Figure 21:
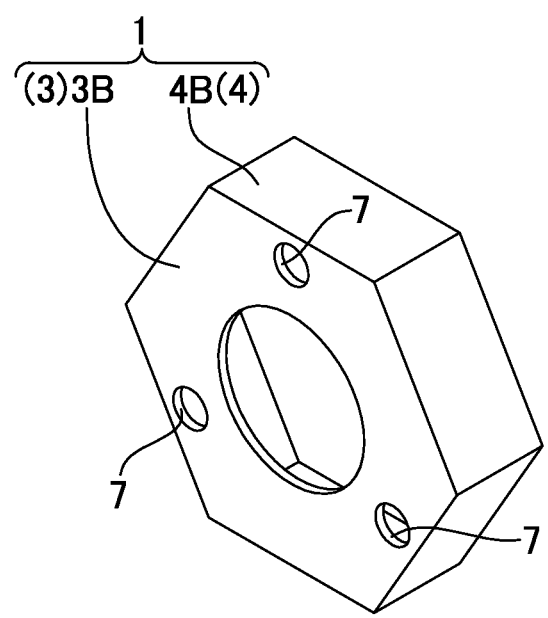
FIG. 21 is a perspective view of a metal component of the insert-molded article shown in FIG. 19.

In an insert-molded article A of a fourth modification shown in a perspective view of FIG. 19, a front view of FIG. 20A, and a vertical cross-sectional right side view of FIG. 20B, the same reference characters as in FIG. 1 and FIGS. 2A and 2B indicate the same or corresponding components or parts. Moreover, in a metal component 1 shown in a perspective view of FIG. 21, the same reference characters as in FIG. 4 indicate the same or corresponding parts.

In the insert-molded article A of the fourth modification, the flat plate-shaped part 3 of the metal component 1 is not a hollow disk 3A as shown in FIG. 4 but a hollow plate 3B having a polygonal shape, e.g., a hexagonal shape. The tubular part 4 of the metal component 1 is not a cylinder 4A as shown in FIG. 4 but a polygonal tube 4B, e.g., a hexagonal tube.

As shown in FIG. 20B, in the insert-molded article A, the rear surface of the polygonal hollow plate 3B and the inner surface of the polygonal tube 4B are exposed. Therefore, in an insert article setting process of an insert-molded article production method described later, when the metal component 1 is set on the movable mold 10 (FIG. 22) of the injection mold I, the rear surface of the polygonal hollow plate 3B and the inner surface of the polygonal tube 4B come into contact with the movable mold 10, whereby the metal component 1 as an insert article can be positioned in the axial direction and the radial direction with respect to the movable mold 10.

As shown in FIGS. 20A and 20B, the inner diameter of the covering part 5 which covers the surface of the polygonal hollow plate 3B is larger than the inner diameter of the polygonal hollow plate 3B, so that an inner peripheral portion of the surface of the polygonal hollow plate 3B is exposed. Therefore, when the injection mold I is clamped in the injection molding process of the insert-molded article production method described later, the inner peripheral portion of the surface of the polygonal hollow plate 3B comes into contact with the fixed mold 9 (FIG. 22) and is stabilized.

<Method for Producing Insert-Molded Article of Fourth Modification>

Figure 22:
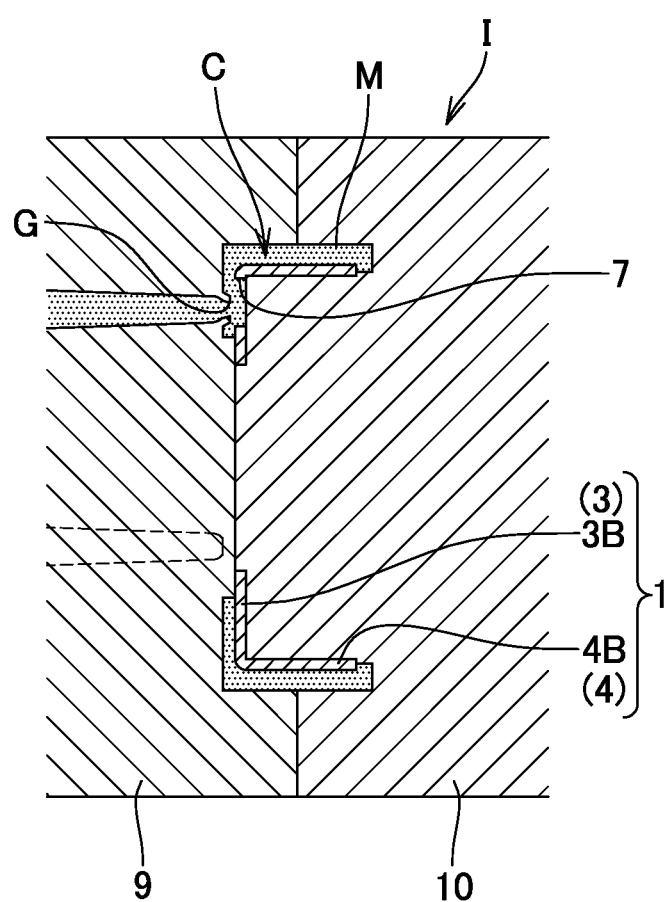
FIG. 22 is a vertical cross-sectional view schematically showing an injection mold for producing the insert-molded article shown in FIG. 19.

With reference to an injection mold I schematically shown in a vertical cross-sectional view of FIG. 22, a method for producing the insert-molded article A of the fourth modification will be described. Gates of the injection mold I are pin gates G.

(Insert Article Setting Process)

The movable mold 10 of the injection mold I is opened, and the metal component 1 as an insert article is set on the movable mold 10 so that the through-holes 7 of the polygonal hollow plate 3B are opposed to the pin gates G of the fixed mold 9.

(Injection Molding Process)

The movable mold 10 of the injection mold I is closed and clamped, and a molten molding resin material M of the resin component 2 is injected into the cavity C through the pin gates G of the fixed mold 9, thereby injection-molding the resin component 2.

(Molded Article Taking-Out Process)

After the resin is solidified by cooling the injection mold I, the movable mold 10 is opened. Then, the insert-molded article A is automatically separated from the pin gates G, and the gate marks B (see FIG. 20A) are left in the insert-molded article A. Next, the insert-molded article A is pushed with ejector pins (not shown) provided in the movable mold 10, so as to be taken out.

<Structure of Insert-Molded Article According to Embodiment of Present Invention>

As described above, in the insert-molded article A including the metal component 1 and the resin component 2 according to the embodiment of the present invention, the metal component 1 has a shape including the flat plate-shaped part 3, and the flat plate-shaped part 3 has the through-holes 7 or the blind holes 8 formed therein. In the insert-molded article A, the resin component 2 has a shape including the covering part 5 which covers the surface E of the flat plate-shaped part 3, and the gate marks B are present at the surface 5A of the covering part 5. The through-holes 7 or the blind holes 8 formed in the flat plate-shaped part 3 of the metal component 1 are located opposite to the gate marks B at the rear surface 5B of the covering part 5 of the resin component 2. The resin component 2 includes the filler parts H with which the through-holes 7 or the blind holes 8 are filled.

<Effects>

In the insert-molded article A and the method for producing the insert-molded article A according to the embodiments of the present invention, the through-holes 7 or the blind holes 8 of the metal component 1 are opposed to the pin gates G, when the insert-molded article A is produced by injection-molding the resin component 2 with the molten resin material M injected through the pin gates G opposing the surface E of the flat plate-shaped part 3 of the metal component 1. Therefore, even when the thickness of the covering part 5, of the resin component 2, which covers the surface E of the flat plate-shaped part 3 of the metal component 1 is reduced, the resin immediately below each gate is thick. Therefore, the resin immediately below the gates is prevented from being solidified before the gates are solidified, whereby sufficient holding pressure can be applied.

Consequently, molding defects such as sink marks and voids hardly occur, whereby the dimensional accuracy and strength of the insert-molded article A are stabilized. Moreover, a cold slug formed in the last shot is inhibited from entering the cavity C of the injection mold I, whereby the appearance and strength of the insert-molded article A are prevented from being deteriorated.

In the embodiments described above, the flat plate-shaped part 3 is the hollow disk 3A or the polygonal hollow plate 3B, and has a center hole in either case. However, the present invention is not limited to such a shape. A "flat plate-shaped part" having no center hole is also within the scope of the present invention.

The description of the above embodiments is in all aspects illustrative and not restrictive. Various improvements and modifications can be made without departing from the scope of the present invention.

What is claimed is:

1. An insert-molded article comprising a metal component and a resin component,
   the metal component having a shape including a flat plate-shaped part, the flat plate-shaped part having a through-hole or a blind hole formed therein,
   the resin component having a shape including a covering part that covers a surface of the flat plate-shaped part, the covering part having a surface in which a gate mark is present, wherein
   the through-hole or the blind hole formed in the flat plate-shaped part of the metal component is located opposite to the gate mark,
   a rear surface of the flat plate-shaped part of the metal component is exposed, and
   the resin component has a filler part with which the through-hole or the blind hole is filled, and the filler part does not protrude from the rear surface of the flat plate-shaped part.

2. The insert-molded article according to claim 1, wherein a distance from the gate mark to the surface of the flat plate-shaped part of the metal component is smaller than a diameter of the gate mark of the resin component.

3. The insert-molded article according to claim 2, wherein a distance from the gate mark to a rear surface of the flat plate-shaped part of the metal component or a distance from the gate mark to a bottom of the blind hole is larger than the diameter of the gate mark of the resin component.

* * * * *